US008024956B2

(12) United States Patent
Hammerschmidt et al.

(10) Patent No.: US 8,024,956 B2
(45) Date of Patent: Sep. 27, 2011

(54) ANGLE MEASUREMENT SYSTEM

(75) Inventors: Dirk Hammerschmidt, Villach (AT);
Patrick Leteinturier, Munich (DE);
Wolfgang Granig, Sachsenburg (AT)

(73) Assignee: Infineon Technologies AG, Neubiberg (DE)

( * ) Notice: Subject to any disclaimer, the term of this patent is extended or adjusted under 35 U.S.C. 154(b) by 593 days.

(21) Appl. No.: 12/202,895

(22) Filed: Sep. 2, 2008

(65) Prior Publication Data
US 2010/0050731 A1 Mar. 4, 2010

(51) Int. Cl.
*G01L 3/00* (2006.01)
*G01L 25/00* (2006.01)
*G01P 21/00* (2006.01)

(52) U.S. Cl. ............... 73/1.11; 73/862.326; 73/862.321; 73/1.41

(58) Field of Classification Search .................... 73/862.331–862.336, 862.321, 73/862.325, 1.41, 1.11; 324/202, 207.2, 324/207.21
See application file for complete search history.

(56) References Cited

U.S. PATENT DOCUMENTS

| | | | |
|---|---|---|---|
| 4,319,188 A * | 3/1982 | Ito et al. ........................ | 324/173 |
| 6,191,579 B1 | 2/2001 | Striker | |
| 7,073,398 B2 | 7/2006 | Kondo et al. | |
| 7,229,746 B2 * | 6/2007 | Schroeder et al. ............ | 430/320 |
| 7,312,609 B2 | 12/2007 | Schmollngruber et al. | |
| 7,394,247 B1 | 7/2008 | Guo et al. | |
| 7,472,004 B2 | 12/2008 | Hara et al. | |
| 2002/0011840 A1 * | 1/2002 | Li ........................... | 324/207.21 |
| 2002/0167310 A1 * | 11/2002 | Wallner et al. ............ | 324/207.25 |
| 2004/0196028 A1 * | 10/2004 | Schroeder et al. ........ | 324/207.22 |
| 2007/0174015 A1 | 7/2007 | Steinlechner | |
| 2007/0276562 A1 * | 11/2007 | Desbiolles et al. ............. | 701/36 |
| 2008/0017149 A1 * | 1/2008 | Kokubo et al. ............ | 123/90.16 |
| 2008/0036454 A1 * | 2/2008 | Landrieve ................ | 324/207.25 |
| 2008/0116886 A1 | 5/2008 | Yamada et al. | |
| 2008/0164867 A1 * | 7/2008 | Steinich et al. ............ | 324/207.2 |

* cited by examiner

*Primary Examiner* — Lisa M Caputo
*Assistant Examiner* — Jonathan Dunlap
(74) *Attorney, Agent, or Firm* — Dicke, Billig & Czaja, PLLC

(57) ABSTRACT

An angular position measurement system including a continuous angular position sensor configured to provide a first signal representative of a continuous angular position of a rotating shaft, an incremental angular position sensor configured to provide a second signal representative of incremental angular positions of the rotating shaft, and a controller configured to calibrate the first signal based on the second signal to provide a third signal representative of a calibrated continuous angular position of the rotating shaft.

25 Claims, 15 Drawing Sheets

US 8,024,956 B2

ANGLE MEASUREMENT SYSTEM

BACKGROUND

For precise control of electrically commutated engines and electrical drives, fast and accurate measurement of the angular position of the rotating motor or drive shaft is required. One conventional approach for measuring such an angular position is to use incremental angular position sensors, such as a tooth wheel or pole wheel type sensors, for example. While incremental sensors typically provide accurate measurement, even at high speeds, they provide only discrete (not continuous) angle measurements. Another approach is to use magnetoresistive type angle sensors, such as giant magnetoresistive (GMR) and anisotropic magnetoresistive (AMR) angle sensors, to measure the angular position. While such angle sensors provide continuous angle measurement, they typically do not provide the required accuracy, particularly at high rotational speeds. As a result, commonly employed techniques often involve using optical encoders or synchro-resolvers which, although providing accurate angle measurement, are complicated and costly.

For these and other reasons, there is a need for the embodiments of the present disclosure.

SUMMARY

One embodiment provides an angular position measurement system including a continuous angular position sensor configured to provide a first signal representative of a continuous angular position of a rotating shaft, an incremental angular position sensor configured to provide a second signal representative of incremental angular positions of the rotating shaft, and a controller configured to calibrate the first signal based on the second signal to provide a third signal representative of a calibrated continuous angular position of the rotating shaft.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
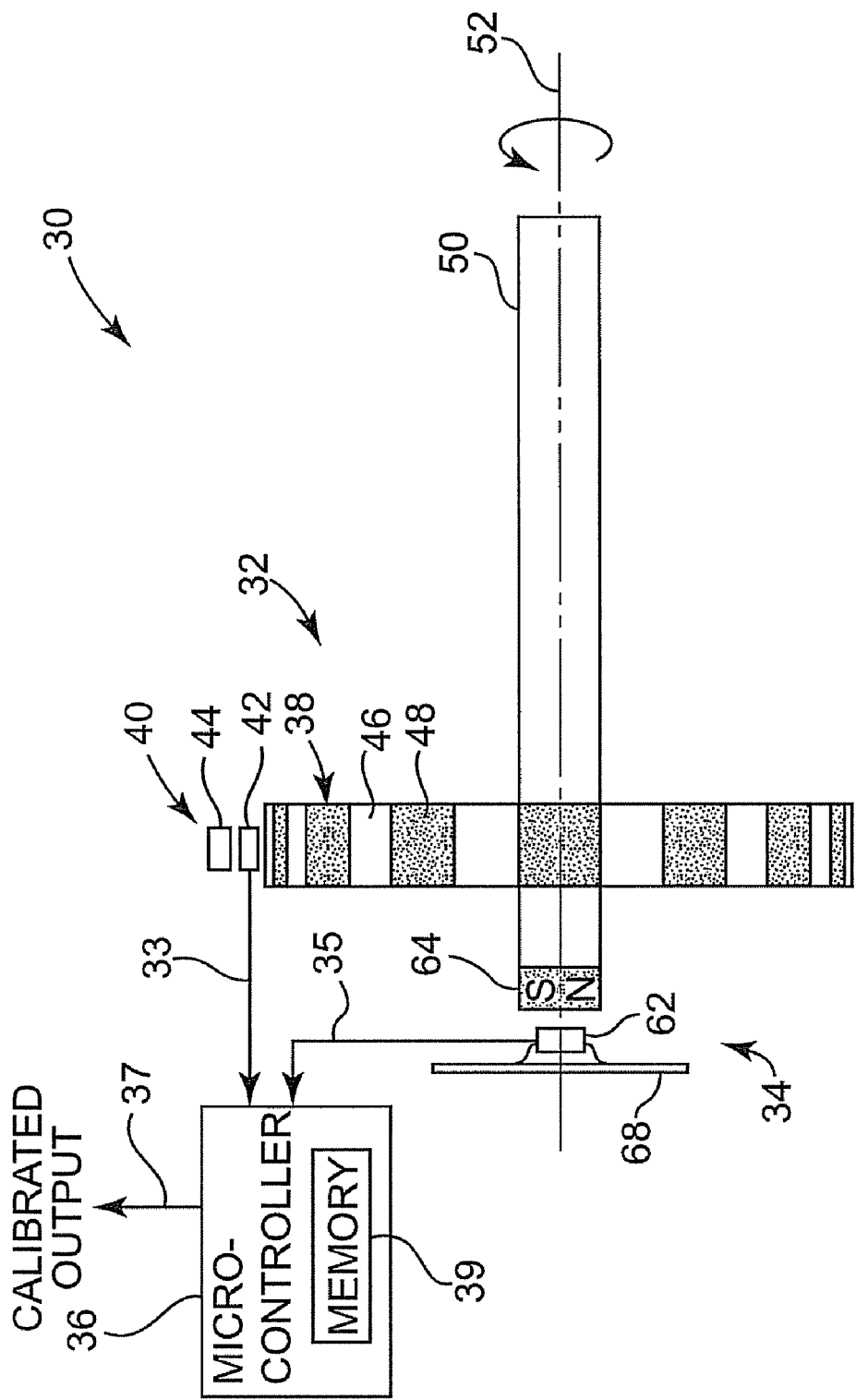
FIG. 1 is a side view generally illustrating an angle measurement system according to one embodiment.

The present disclosure describes embodiments of an angle measurement system for measuring an angular position of a rotating shaft which employs a magnetoresistive angle sensor (e.g. GMR, AMR), or other suitable type of continuous angle measurement device, which provides an output representative of a continuous angular position of the rotating shaft and which is calibrated based on an output of an incremental position sensor, such as a tooth wheel or pole wheel type position sensor, for example FIG. 1 generally illustrates one embodiment of an angle measurement system 30 according to the present disclosure for measuring the angular position of a rotating member, such as rotating shaft 50. Shaft 50 may be any number of rotating members, such as a motor shaft or a shaft of an electrical drive, for example. Angle measurement system 30 includes an incremental angular position speed sensor 32, a continuous angular position sensor 34, and a controller 36. According to one embodiment, incremental angular position sensor 32 is a wheelspeed sensor. Wheelspeed sensor 32 provides an incremental angular position signal 33 (e.g. an analog signal) representative of incremental angular positions of rotating shaft 50, and continuous angular position sensor 34 provides a continuous angular position signal 35 representative of a continuous angular position of shaft 50. Controller 36, as will be described in greater detail, provides a corrected or calibrated continuous angular position signal 37 representative of the continuous angular position of rotating shaft 50 based on incremental position signal 33 and on continuous angular position signal 35.

Figure 2:
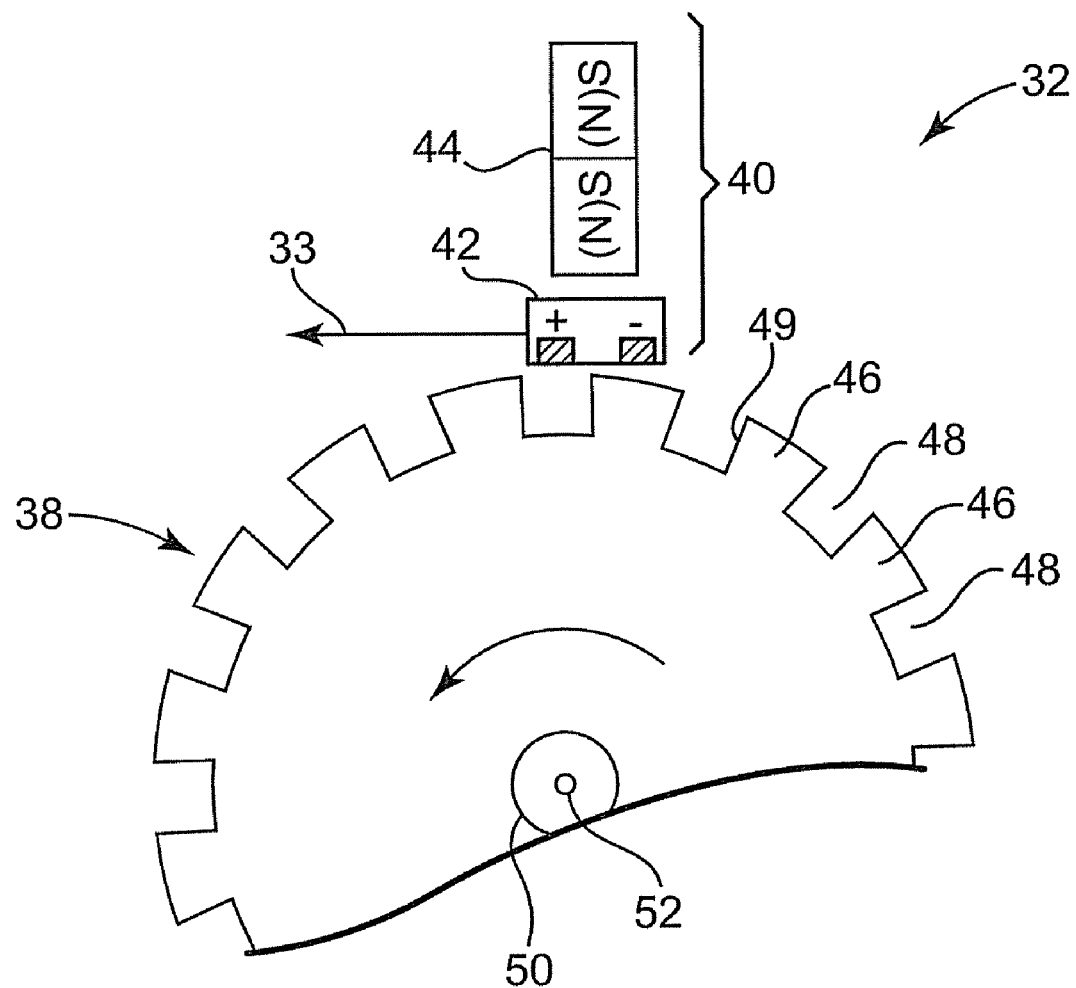
FIG. 2 is a cross-sectional view illustrating portions of a wheelspeed sensor suitable for use with the angle measurement system of FIG. 1 according to one embodiment.

FIG. 2 generally illustrates one embodiment of wheelspeed sensor 32 of FIG. 1. Wheelspeed sensor 32 includes a toothwheel 38 and a sensor 40, with sensor 40 further including a magnetic field sensor 42 and a permanent magnet 44. Toothwheel 38 is mounted to rotating shaft 50 and configured to rotate with shaft 50 about an axis of rotation 52. Toothwheel 38 is formed from a magnetic material and includes a plurality of teeth 46, separated by gaps 48, disposed along its circumference. According to one embodiment, teeth 46 and gaps 48 have a same arc length along the circumference of toothwheel 38 such that tooth flanks 49 at transitions between teeth 46 and gaps 48 occur at regular intervals.

Shaft 50 is indexed to toothwheel 38 so that each tooth flank 49 represents a specific or known angular position of shaft 50 as it rotates. For example, according to one implementation, toothwheel 38 includes sixty teeth 46 such that tooth flanks 49 occur every 3-degrees about the circumference of toothwheel 38. In such an instance, a first or index tooth may represent an angular position of 0-degrees, a next tooth 3-degrees, a next tooth 6-degrees, and so on around the full 360-degrees of toothwheel 38.

Magnetic field sensor 42 and permanent magnet 44 are disposed in a fixed position relative to one another, with magnetic field sensor 42 being positioned proximate to the circumference of toothwheel 38. Permanent magnet 44 provides a back bias magnetic field that is superimposed on magnetic field sensor 42. Magnetic field sensor 42 may be a Hall element, a coil type sensor, a magnetoresistive sensor (e.g. a giant magnetoresistive (GMR) sensor, a colossal magnetoresistive (CMR) sensor), or any other suitable magnetic field sensor.

In operation, as shaft 50 rotates about axis 52, teeth 46 and gaps 48 pass sensor 40 and create variations in the magnetic field provided by permanent magnet 44. Based on the magnetic field variations, magnetic field sensor 42 detects tooth flanks 49 as they pass and provides a incremental position signal 33 (e.g. an analog signal) representative of incremental angular positions of rotating shaft 50 based on the detected tooth flanks. For example, according to the example implementation described above, each tooth flank 49 represents a known angular position of shaft 50 at 3-degree intervals. According to such an implementation, signal 33 provides angular position measurements of shaft 50 at 120 discrete points as shaft 50 rotates.

Toothwheels can be manufactured very precisely. For example, according to one embodiment, when employing a toothwheel having a diameter of 10 centimeters and 60 teeth, incremental position sensor 32 achieved an accuracy 0.3 degrees. The precision of a toothwheel depends on its size. The larger its circumference, the more teeth that can be employed so that tooth flanks occur at smaller angles (e.g. 120 teeth provides tooth flanks 49 at 1.5-degree intervals), thereby increasing the precision of the toothwheel and the accuracy of the incremental position sensor. As such, incremental position signal 33 provides an accurate angular position of rotating shaft 50, but only at the incremental positions corresponding to positions of tooth flanks 49.

Although described and illustrated herein primarily in terms of a toothwheel type speed sensor, incremental angular position sensor 32 may comprise any suitable type of incremental angular position sensor. For example, as mentioned above, in some embodiments, wheelspeed sensor 32 may comprise a polewheel type speed sensor, wherein a series of alternating magnetic poles (e.g. north-south-north-south) are employed and detected by sensor 40 in lieu of teeth 46.

Figure 3:
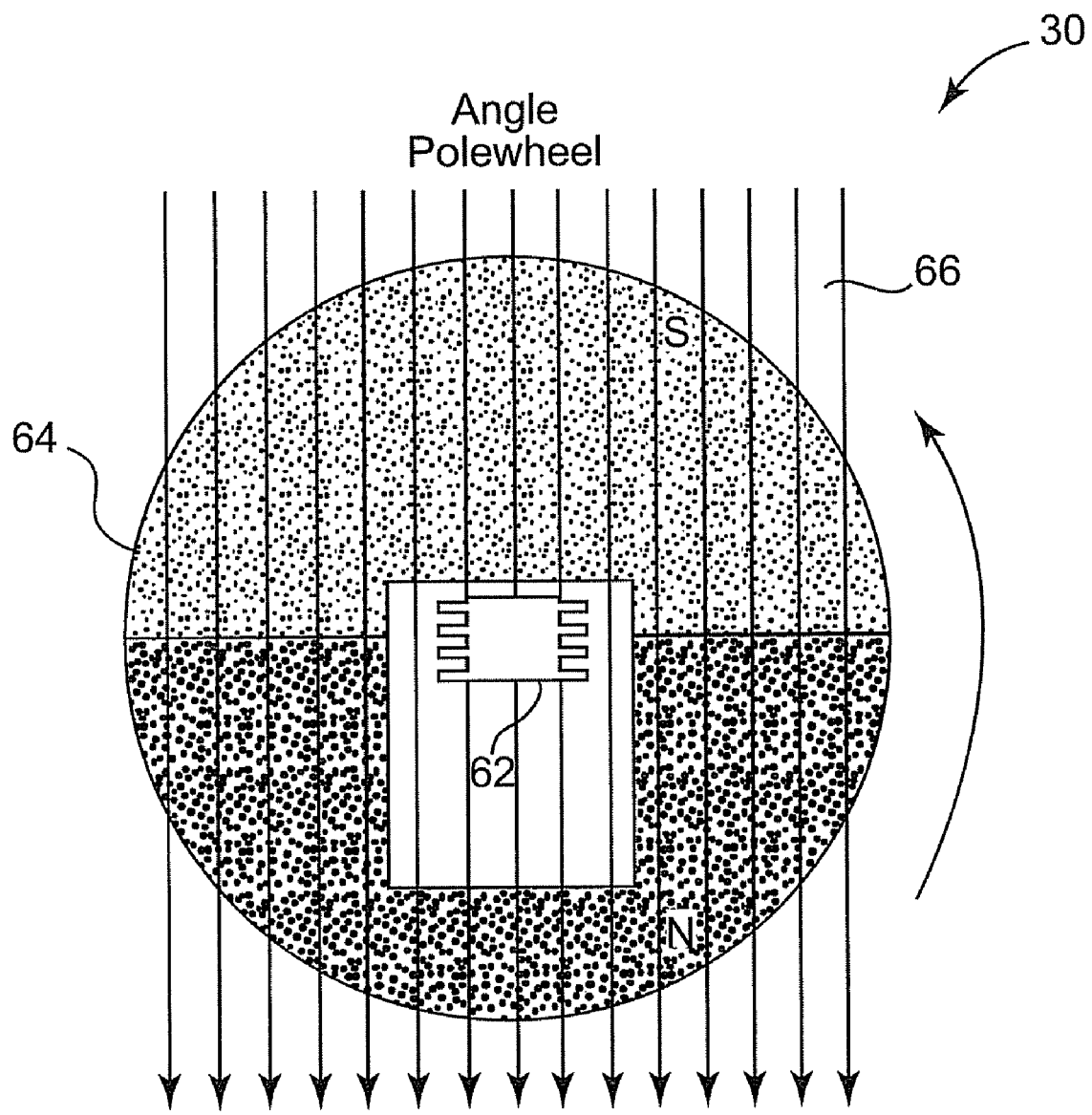
FIG. 3 is a diagram illustrating an example of a GMR sensor positioned at a center of rotation of a magnet according to one embodiment.

Returning to FIG. 1, according to one embodiment, continuous angular position sensor 34 includes a magnetoresistive angle sensor 62 positioned within a magnetic field provided by a permanent magnet 64 which is mounted to an end of rotating shaft 50, wherein the magnetic field rotates with shaft 50 about rotational axis 52. FIG. 3 is an end view showing portions of angle measurement system 30 and illustrating magneto resistive angle sensor 62 positioned within a magnetic field 66 shown extending from a south pole 65 to a north pole 67. Although illustrated as being positioned at an end of shaft 50, permanent magnet may comprise a ring magnet mounted at a position along a length of shaft 50 (i.e. not an end) with magnetoresistive angle sensor 62 being positioned within the magnetic field at a radially off-center position from rotational axis 52 (see FIG. 12).

According to one embodiment, magnetoresistive angle sensor 62 comprises a GMR angle sensor 62. In one embodiment, as illustrated by FIG. 1, GMR angle sensor 62 comprises a semiconductor chip mounted on a printed circuit board (PCB) 68. According to one embodiment, microcontroller 36 is integral to GMR angle sensor semiconductor chip 62. According to one embodiment, PCB 68 and thus, GMR angle sensor 62, are positioned in a plane parallel to a surface of permanent magnet 64. As described in greater detail below, GMR angle sensor 62 provides a continuous angular position signal 35 (e.g. an analog signal) representative of the continuous angular position of rotating shaft 50.

Figure 4:
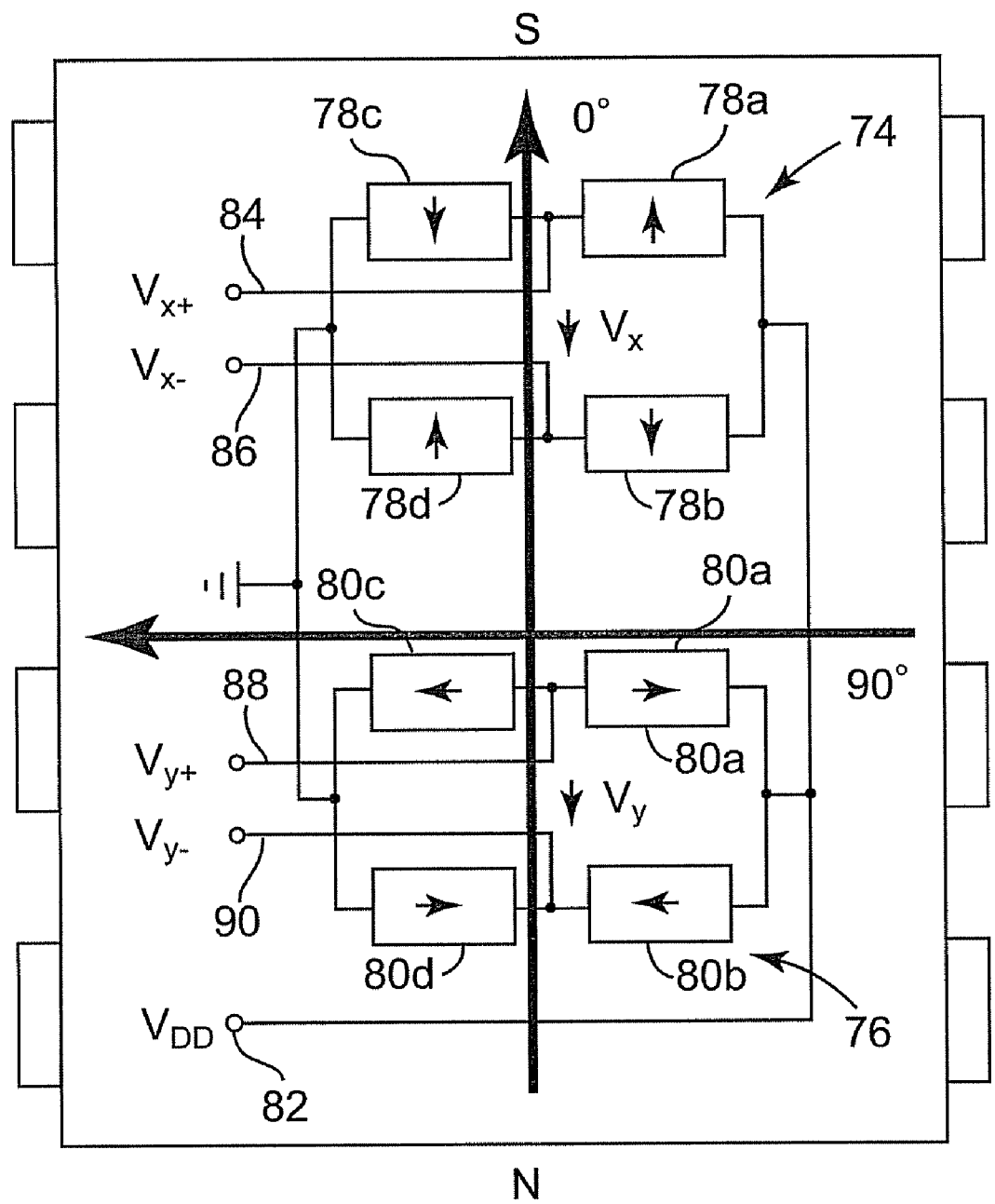
FIG. 4 is a block and schematic diagram generally illustrating GMR semiconductor angle sensor and a GMR resistor configuration according to one embodiment.

FIG. 4 is a block and schematic diagram generally illustrating one embodiment of GMR angle sensor 62 when configured as a semiconductor chip. According to one embodiment, GMR angle sensor 62 includes a GMR resistor region 72 having a pair of GMR sensor bridges 74 and 76, with sensor bridge 74 being formed by four GMR resistors 78a-78d and sensor bridge 76 formed by four GMR resistors 80a-80d. According to the bridge implementation of FIG. 4, GMR sensor bridges 74 and 76 are disposed orthogonally to one another and are respectively configured to sense an x-component and a y-component of a rotating electrical field, such as magnetic field 66 of FIG. 3. The arrows associated with GMR resistors 78a-78d and 80a-80d indicate the direction of the fixed magnetic field portion of the resistor.

A supply voltage $V_{DD}$ is applied to a terminal 82, with voltage signals $V_X+$ and $V_X-$ being provided at terminals 84 and 86 of GMR sensor bridge 74, and voltage signals $V_Y+$ and $V_Y-$ being provided at terminals 88 and 90 of GMR sensor bridge 76, and which are representative of an angular position of magnetic field 66 relative to a reference vector (e.g. 0-degrees). In response to movement of an external magnetic field, such as rotation of magnetic field 66, one or more of the GMR resistors 78a-78d and 80a-80d change their electrical resistances, causing changes in voltage signals $V_X+$ and $V_X-$ at terminals 84 and 86 and voltage signals $V_Y+$ and $V_Y-$ at terminals 88 and 90 which reflect the changes in the position of the magnetic field.

Figure 5:
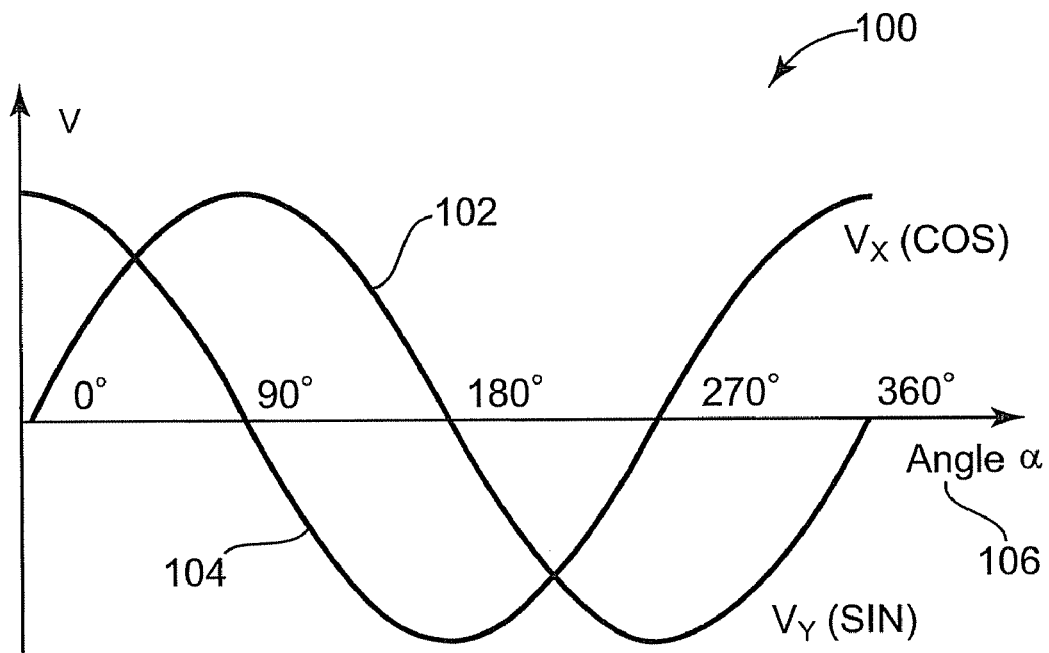
FIG. 5 is a graph illustrating examples of ideal output curves provided by the GMR angle sensor of FIG. 4, according to one embodiment.
Figure 6:
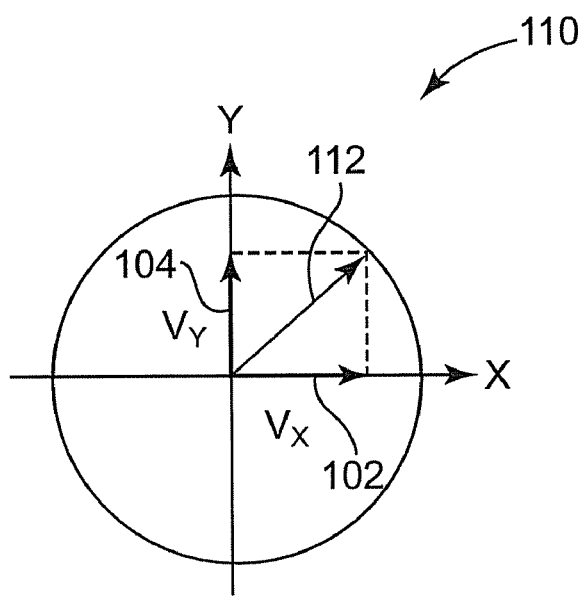
FIG. 6 is a graph generally illustrating a positional vector based on the output curves as illustrated by FIG. 5, according to one embodiment.

FIG. 5 is a graph 100 illustrating "ideal" output signals $V_X$ 102 and $V_Y$ 104 provided by GMR angle sensor 62 and which are respectively based on voltage signals $V_X+$ and $V_X-$ and voltage signals $V_Y+$ and $V_Y-$ as magnetic field 66 rotates from 0-360 degrees, as indicated by the angle α at 106. As illustrated by graph 110 of FIG. 6, output signals $V_X$ 102 and $V_Y$ 104 respectively represent x- and y-components of a vector 112 indicative of the angular position of magnetic field 66. According to one embodiment, output signals $V_X$ 102 and $V_Y$ 104 comprise signal 35 provided to controller 36 which determines the angular position of magnetic field 66 and thus, the angular position of shaft 50, based on the above relationship.

As mentioned above, graph 100 represents output signals $V_X$ 102 and $V_Y$ 104 under ideal conditions. Under such ideal conditions, each of the GMR resistors 78a-78d and 80a-80d have identical characteristics, and GMR sensor bridges 90 and 92 are perfectly orthogonal to one another, for example, such that output signals $V_X$ 102 and $V_Y$ 104 provide an exact representation of the angular position of magnetic field 66. However, due to manufacturing tolerances, there are inherent variations between GMR resistors 78a-78d and 80a-80d which cause amplitude and offset variations between output signals $V_X$ 122 and $V_Y$ 124. Additionally, the directions of fixed magnetic field portions of GMR resistors 78a-78d and 80a-80d are not likely to be perfectly orthogonal to one another which causes phase errors between output signals $V_X$ 102 and $V_Y$ 104 (i.e. have a phase offset other than 90-degrees). Such amplitude, offset, and phase errors, in-turn, cause errors in the angular position of the magnetic field, such as magnetic field 66, as measured by GMR angle sensor 62.

Figure 7:
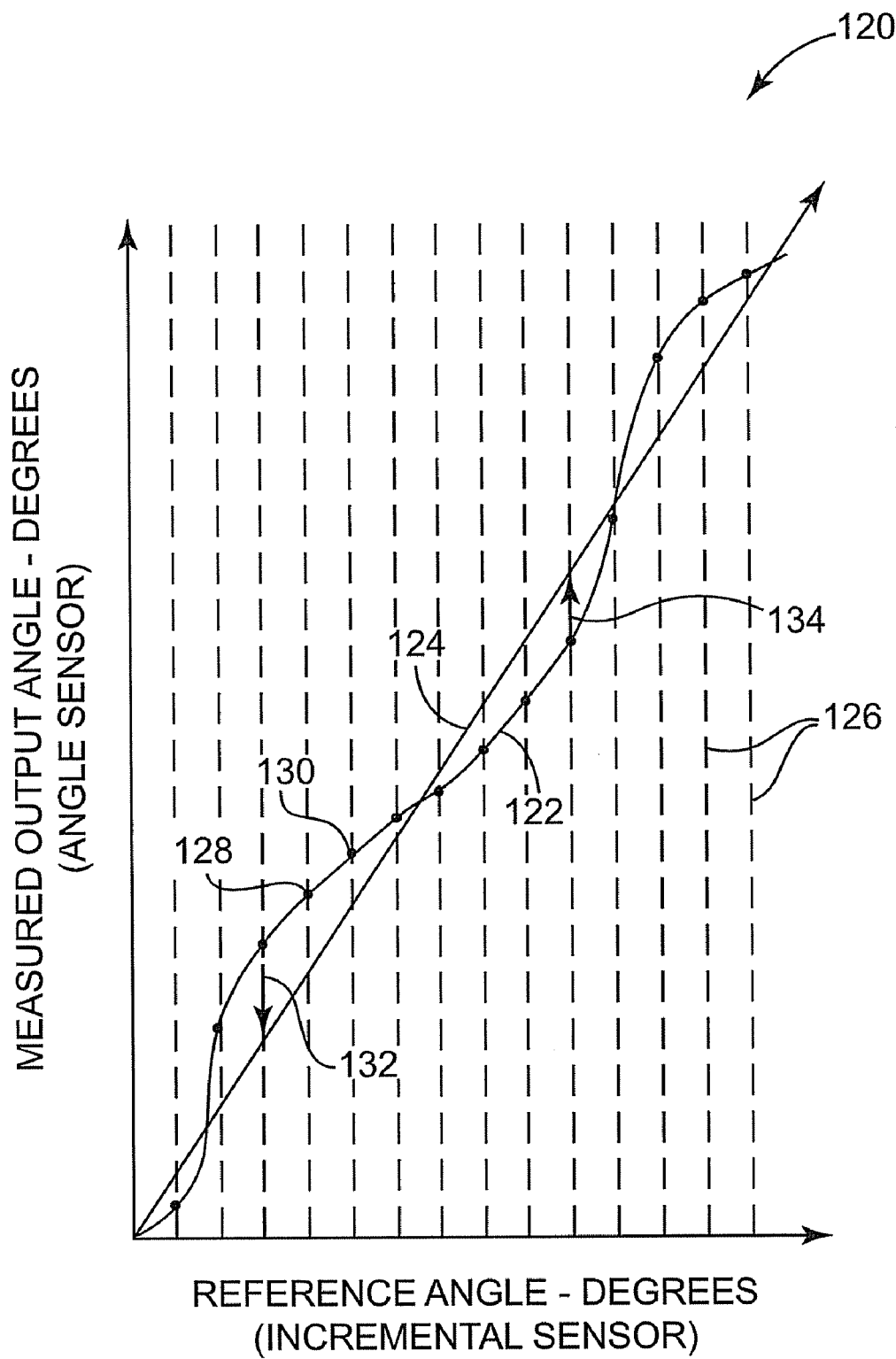
FIG. 7 is a graph illustrating examples of the continuous angular position as measured by a GMR angle sensor and incremental angular position measures by a wheelspeed sensor according to one embodiment.

FIG. 7 is a graph 120 illustrating an example of the angular position of rotating shaft 50 as measured by GMR angle sensor 62, represented by sinusoidal-like curve 122, relative to a "known" or reference angular position of rotating shaft 50 as measured by incremental angle position sensor 32 and represented by straight-line curve 124. Under ideal conditions, the angular position measured by GMR angle sensor 62 (i.e. curve 122) would follow straight-line reference angle curve 124. However, due at least in part to the above described errors with respect to output signals $V_X$ 102 and $V_Y$ 104, the angular position of rotating shaft 50 as measured by GMR angle sensor 62 varies from the actual or reference position of rotating shaft 50 as measured by incremental position sensor 32.

In FIG. 7, each of the vertical dashed lines, such as those indicated at 126, represents a tooth flank 49 of toothwheel 38 and a corresponding reference angular position of rotating shaft 50. Each of the highlighted points along curve 122, such as points 128 and 130, indicates the angular position of shaft 50 as measured by GMR angle sensor 62 when shaft 50 is at the reference angular position corresponding to the associated tooth flank. The error between these points, as measured by GMR angle sensor 62, and the reference angular position, as measured by incremental position sensor 32, is illustrated by the arrows at 132 and 134.

According to one embodiment, controller 36 determines the error between each of the discrete or incremental reference angle measurements of rotating shaft 50 made by incremental angle sensor 32 at each tooth flank 49 and the corresponding measurement of the angular position GMR angle sensor 62 over a full rotation of shaft 50. According to one embodiment, based on these discrete error measurement points, controller 36 determines an error curve for GMR angle sensor 62 for a full rotation of shaft 50.

Figure 8:
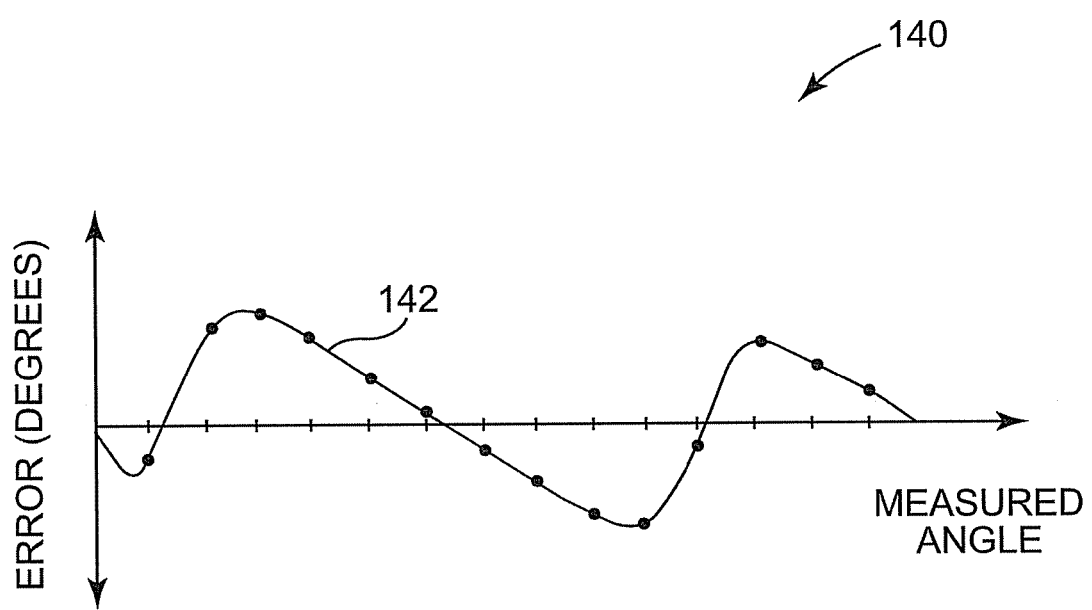
FIG. 8 is graph illustrating an example of an error curve according to one embodiment.

FIG. 8 is a graph 140 illustrating an error curve 142 determined by controller 36 based on the example illustrated by graph 120 of FIG. 7. The highlighted points, as indicated by points 144 and 146, represent the error between the angular position of shaft 50 as measured by GMR angle sensor 62 and the discrete reference angular position measurements provided by incremental angular position sensor 32. According to one embodiment, controller 36 continuously calibrates GMR angle sensor 62 by continuously updating the error curve during operation of angle measurement system 36. In one embodiment, controller 36 periodically updates the error curve.

According to one embodiment, controller 36 employs interpolation techniques to fit a curve to the discrete error points. Examples of such interpolation techniques include piece-wise linear interpolation, polynomial interpolation, least-squares-fit polynomial interpolation, or any other suitable interpolation technique. In one embodiment, controller 36 stores the error curve in a memory, such as a memory 39.

During operation, controller 36 determines the continuous angular position of rotating shaft 50 as measured by GMR angle sensor 62 based on output signals $V_X$ 102 and $V_Y$ 104 received via signal 35, such as illustrated by curve 122 of FIG. 7. Controller 36 then subtracts the error curve (e.g. error curve 142) from the continuous angular position measurement of GMR angle sensor 62 (e.g. curve 122) to provide output signal 37 which represents a corrected continuous angular position measurement of rotating shaft 50. In essence, angle measurement system 30 calibrates GMR angle sensor 62 using incremental angular position sensor 32 to provide a fast, accurate, and continuous angular position measurement of rotating shaft 50 at output signal 37. Additionally, by calibrating GMR angle sensor 62 in this fashion, angle measurement system 30 is able to compensate for errors in continuous angular position measurement of GMR angle sensor 62 resulting from variations in operating temperature and for aging-related factors over the lifetime of GMR angle sensor 62.

In other embodiments, as will be described in greater detail below, in lieu of determining an error curve over a full rotation of shaft 50 and adjusting the full angular position measurement curve (e.g. curve 122) provided by GMR angle sensor 62, controller 36 separately adjusts or calibrates each segment of the continuous angular position measurement curve occurring between consecutive tooth flanks 49 of incremental angular position sensor 32. For example, in the above described scenario where toothwheel 38 has sixty teeth 46, the continuous angle position measurement curve (e.g. curve 122) comprises 120 curve segments, one curve segment between each pair of consecutive tooth flanks 49. In such a scenario, controller 36 individually adjusts or calibrates each of the 120 curve segments to substantially minimize the error between the curve segment and the corresponding segment of the reference angle curve (i.e., straight-line curve 124).

As described above, due to manufacturing tolerances, there are typically amplitude, offset, and phase variations between output signals $V_X$ 102 and $V_Y$ 104 that result in errors in the angular position measurement provided by GMR angle sensor 62. According to one embodiment, output signals $V_X$ 122 and $V_Y$ 124 are defined by the following equations:

$$V_X = A_X * \cos(\alpha + \phi_X) + O_X; \text{ and} \qquad \text{Equation I}$$

$$V_Y = A_Y * \cos(\alpha + \phi_Y) + O_Y; \text{ where:} \qquad \text{Equation II}$$

$A_X$=amplitude parameter of $V_X$ signal;
$A_Y$=amplitude parameter of $V_Y$ signal;
$O_X$=offset parameter of $V_X$ signal;
$O_Y$=offset parameter of $V_Y$ signal;
$\phi_X$=phase parameter of $V_X$ signal; and
$\phi_Y$=phase parameter of $V_Y$ signal.

The amplitude, offset, and phase parameters $A_X$, $A_Y$, $O_X$, $O_Y$, $\phi_Y$, and $\phi_X$, together represent GMR parameters having values which can be adjusted to modify the waveform of output signals $V_X$ 122 and $V_Y$ 124 to correct for errors in the angular position measured by GMR angle sensor 62 resulting from manufacturing and other variances (e.g. temperature).

According to one embodiment, controller 36 determines a set of GMR parameter values for each segment of the continuous angular position curve provided by GMR angle sensor 62 that substantially minimizes the error between the curve segment and the corresponding segment of the reference angle curve (i.e., straight-line curve 124). In one embodiment, each set of GMR parameters values is stored in memory 39 and, during operation of angle measurement system 30, is applied by controller 36 to dynamically adjust output signals $V_X$ 122 and $V_Y$ 124 of the corresponding curve segment and thereby provide calibrated continuous angular position measurement output signal 37.

In another embodiment, as described below, in lieu of determining sets of GMR parameter values, controller 36 determines and applies a gain factor to each segment of the continuous angular position curve determined from output signals $V_X$ 102 and $V_Y$ 104 of GMR angle sensor 62.

Figure 9:
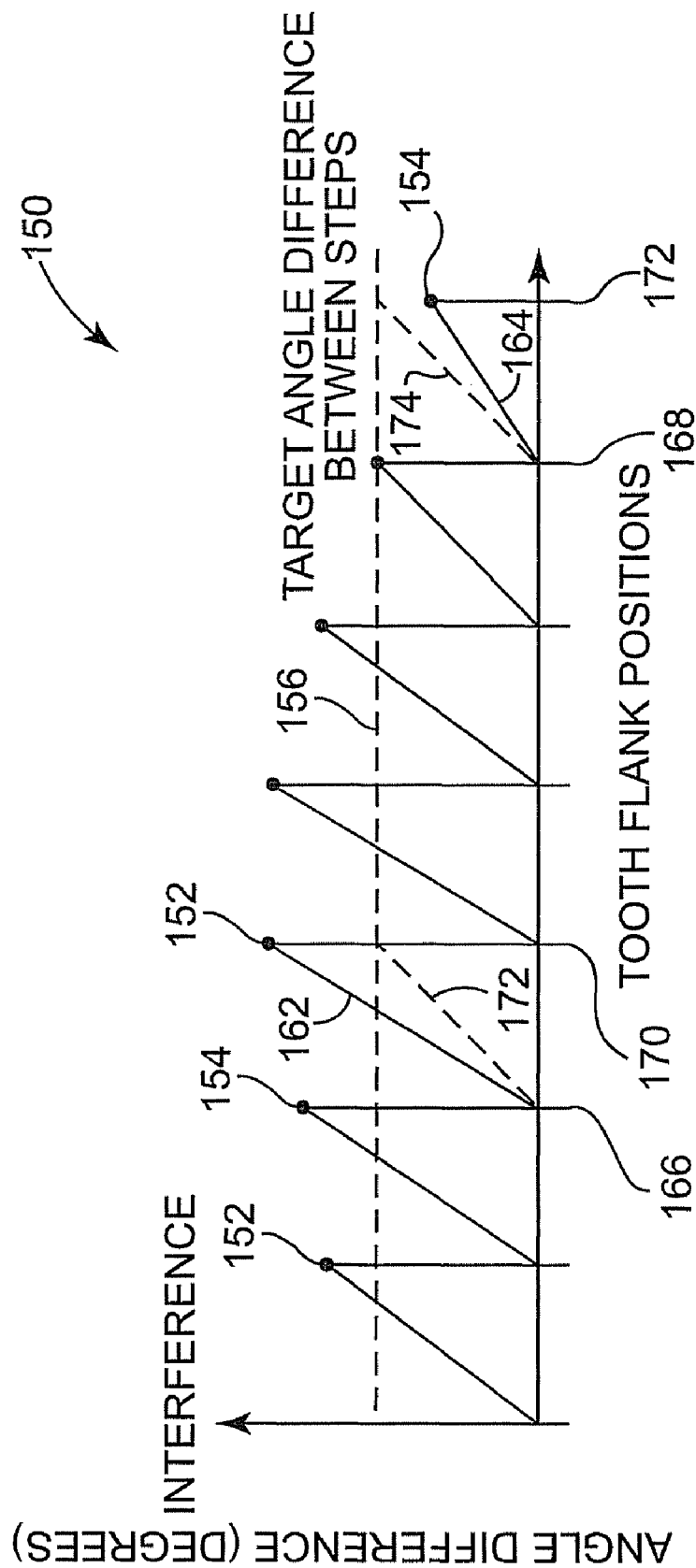
FIG. 9 is graph illustrating examples of changes in angular positions of a continuous angular position as measured by a GMR sensor relative to changes in incremental angular positions.

FIG. 9 is a graph 150 illustrating an example of the tooth-flank to tooth-flank differences in angular position as measured by GMR angle sensor 62. In FIG. 9, tooth flanks 49 of toothwheel 38 are indicated along the x-axis, and the angle difference is illustrated on the y-axis. Each bold point, such as points 152 and 154, indicates the difference or change in the continuous angular position as measured by GMR angle sensor 62 between the corresponding tooth flank relative to the preceding tooth flank. The horizontal dashed line at 156 represents the actual, or target, angular difference from tooth-flank to tooth-flank. For example, in the earlier described scenario where toothwheel 38 includes sixty teeth 49, the actual or target angular is 3-degrees.

If there were no errors in the continuous angular position as measured by GMR angle sensor 62, the bold points, including points 152 and 154, would not deviate from dashed line 156. Additionally, if there were no errors, each of the lines between the data points and the preceding tooth flank, such as lines 162 and 164 from data points 152 and 154 to the preceding tooth flanks 166 and 168, would follow and have the same slope as dashed lines 172 and 174.

According to one embodiment, controller 36 determines a gain factor for each tooth-flank to tooth-flank segment of the continuous angular position measurement provided by GMR angle sensor 62 based on the difference in angular position of the segment relative to the target angular difference 156. In one embodiment, the gain factor for each tooth-flank to tooth-flank segment is equal to the ratio of the target angular difference 156 to the measured tooth-flank to tooth-flank angular position difference. As such, when each of the gain factors is applied to the continuous angle position measurement provided by GMR angle sensor 62, the angular difference of each tooth-flank to tooth-flank segment is equal to the target angle difference.

For example, with respect to the segment of the continuous angular position measurement occurring between tooth flanks 166 and 170 in FIG. 9, the gain factor is equal to the ratio of the target angle difference 156 to the angular difference of point 154 (i.e. a ratio 1<). When this gain factor is applied to the corresponding segment of the continuous angular position measurement occurring between tooth flanks 166 and 170, the slope of line 162 is decreased so as to substantially equal to that of line 172 such that line 162 will overlay and match line 172. Similarly, with respect to the segment of the continuous angular position measurement occurring between tooth flanks 168 and 172, the gain factor is equal to the ratio of the target angle difference 156 to the angular difference of point 154 (i.e. a ratio >1). When this gain factor is applied to the corresponding segment of the continuous angular position measurement occurring between tooth flanks 168 and 172, the slope of line 164 is increased so as to substantially equal to that of line 174 such that line 164 will overlay and match line 174.

According to one embodiment, controller 36 determines a gain factor for each segment of the continuous angular position curve provided by GMR angle sensor 62. In one embodiment, each gain factor is stored in memory 39 and, during operation of angle measurement system 30 is applied by controller 36 to dynamically adjust the continuous angular output measurement of GMR angle sensor 62 and thereby provide calibrated continuous angular position measurement output signal 37.

Figure 10:
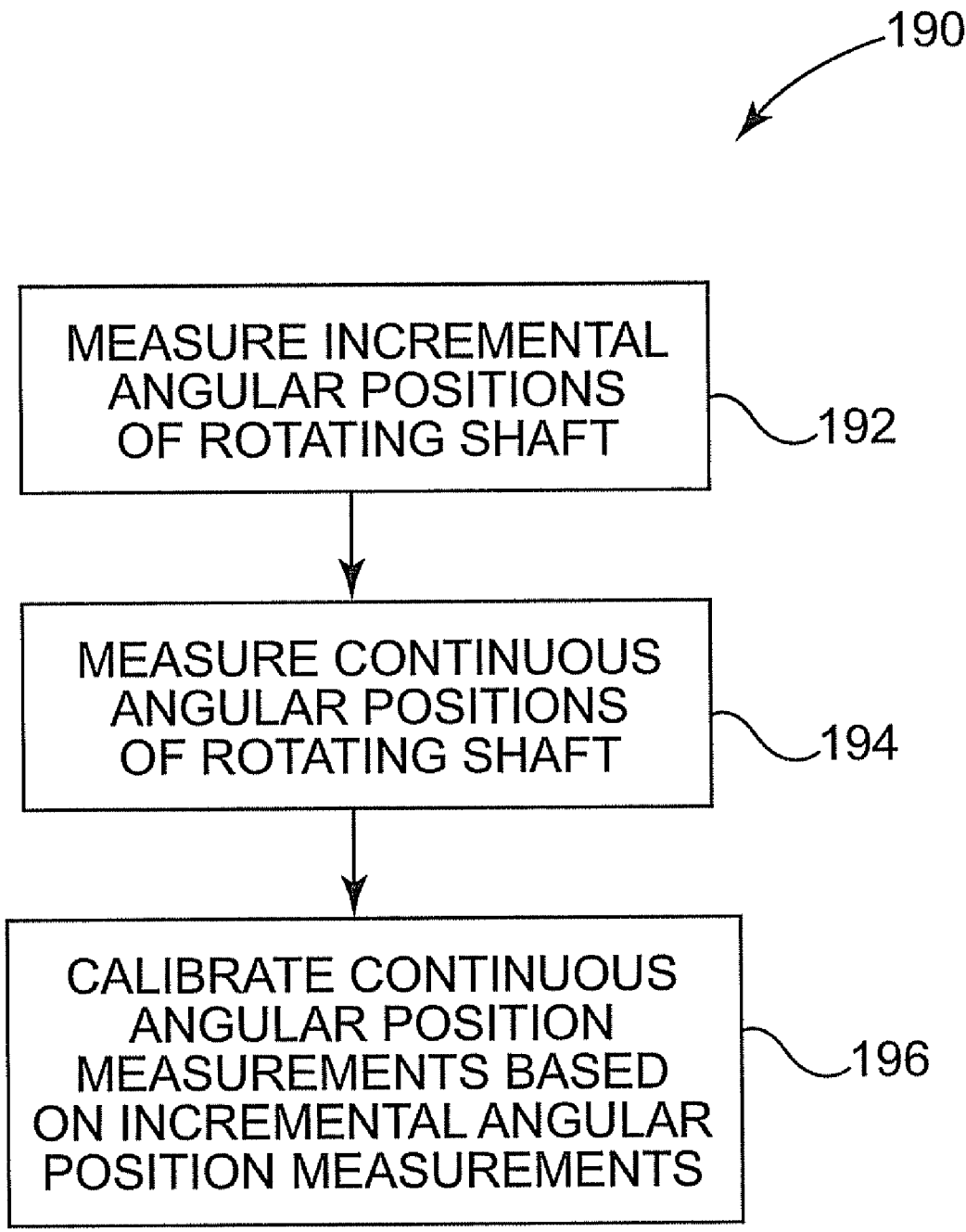
FIG. 10 is a flow diagram illustrating an operating and calibration procedure of an angular position sensor according to one embodiment.

FIG. 10 is a flow diagram generally illustrating one embodiment of a process 190 for providing fast and accurate continuous angular position measurement of a rotating shaft, such as shaft 50 of FIG. 1. Process 100 begins at 192 by determining an incremental angle measurement of the rotating shaft, such as through use of a toothwheel or polewheel based speed sensor, such as toothwheel speed sensor 32 of FIG. 1. Process 190 continues at 194 with determining a continuous angular position measurement of the rotating shaft, such as through use of a GMR angle sensor, such as GMR angle sensor 62 of FIG. 1, for example.

At 196, the continuous angular position measurement determined at 194 is adjusted or calibrated based on the incremental angular position measurement determined at 192 so as to provide a calibrated continuous angular position measurement. According to one embodiment, the calibration includes determining an error curve over a full rotation, such as described above with respect to FIGS. 7 and 8. In one embodiment, the calibration includes determining sets of values of GMR parameters for segments of the continuous angular position measurement occurring between consecutive incremental angular position measurements. In one embodiment, the calibration includes determining gain factors for segments of the continuous angular position measurement, such as described above with respect to FIG. 9.

Figure 11:
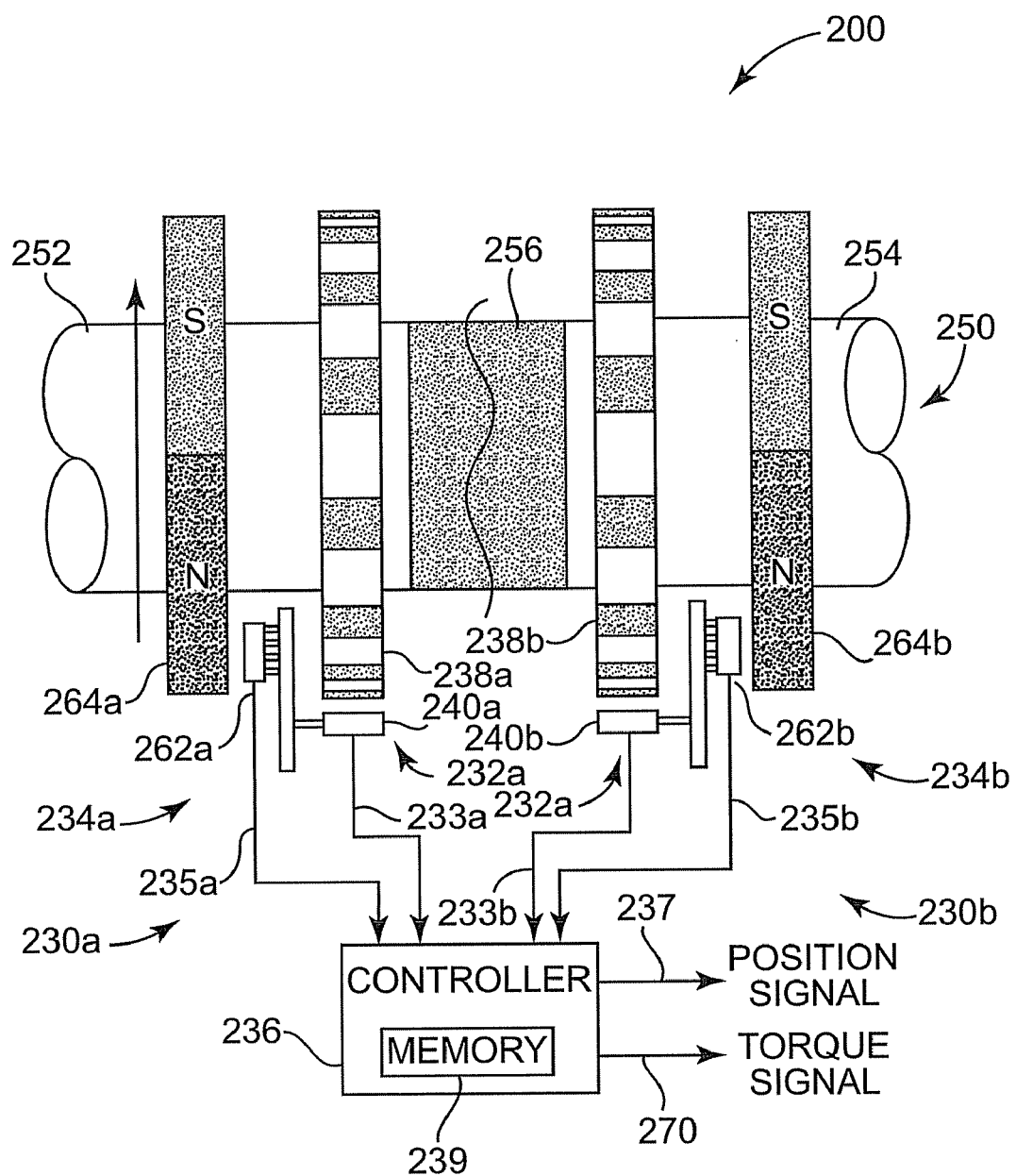
FIG. 11 is a block and schematic diagram illustrating a torque sensor according to one embodiment.

According to one embodiment, as illustrated by FIG. 11, a pair of angle measurement systems 230a and 230b, each similar to angle measurement system 30, is configured to form a sensor system 200 for measuring the angle of and an amount of torque applied to a rotating shaft 250. Shaft 250 includes a first shaft 252 and a second shaft 254 coupled to one another via a torsion shaft 256, wherein torsion shaft 256 transmits load between first and second shafts 252 and 254 and is able to twist or flex to enable relative angular displacement of first and second shafts 252 and 254 which is proportional to an amount of torque placed on the shafts. For example, if first shaft 252 is a steering shaft of a vehicle and second shaft 254 is a steering linkage shaft, the amount of angular displacement between first and second shafts 252 and 254 is proportional to an amount of torque being applied to a steering wheel.

Figure 12:
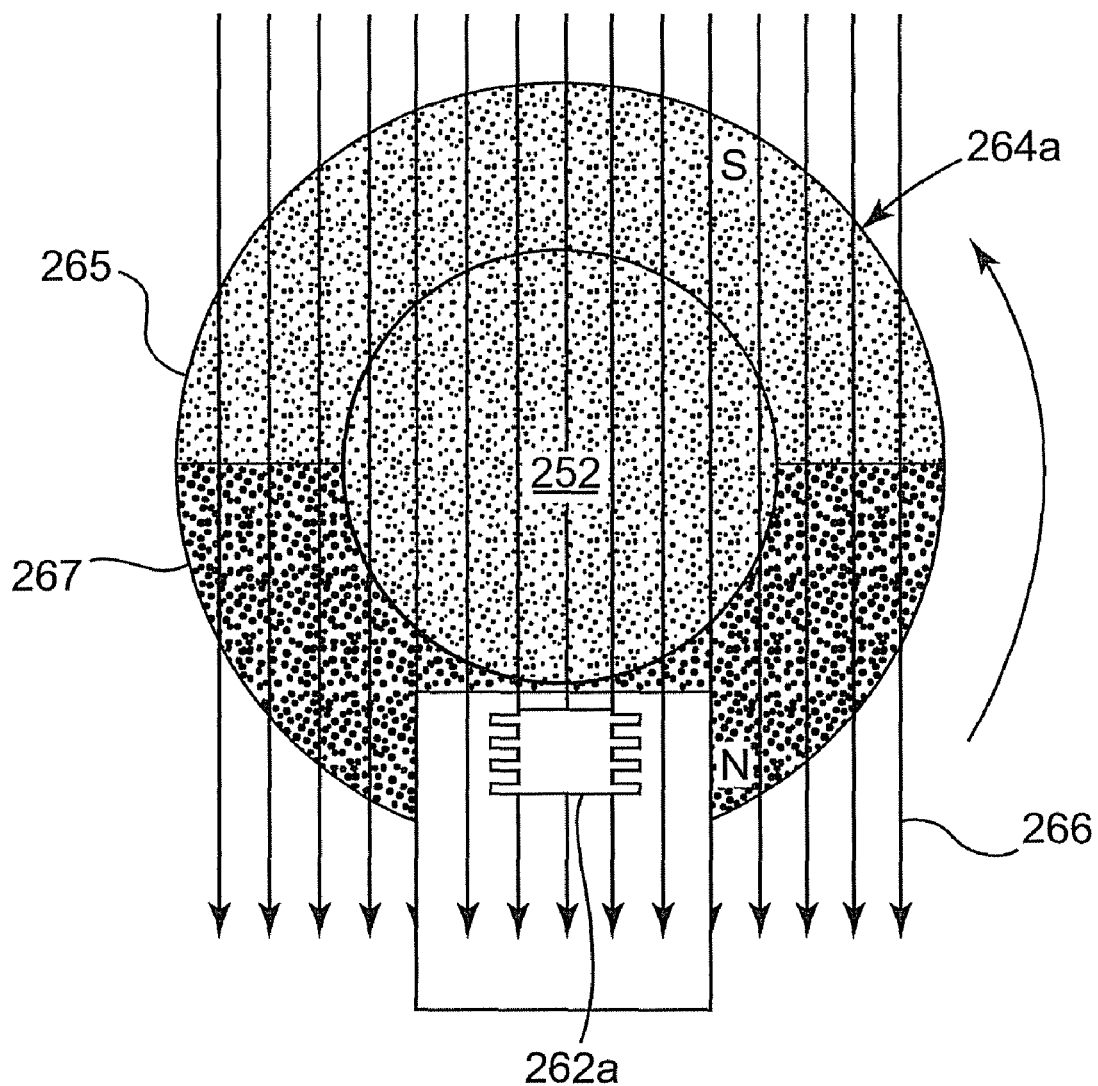
FIG. 12 is a diagram illustrating an example of a GMR sensor positioned off-center from a center of rotation of a ring magnet according to one embodiment.

As illustrated, first angle measurement system 230a includes a speed sensor 232a and a continuous angular position sensor 234a. According to one embodiment, speed sensor 232a includes a toothwheel 238a and a magnetic field sensor 240a (e.g. a GMR-based sensor) providing an incremental angular position signal 233a. According to one embodiment, continuous angular position sensor 234a includes a GMR angle sensor chip 262a positioned within a magnetic field of a permanent ring magnet 264a mounted circumferentially about first shaft 252 and providing a continuous angular position signal 235a. FIG. 12 is a cross-sectional view illustrating portions of sensor system 200 and showing GMR angle sensor chip 262a positioned within a magnetic field 266 extending from a south pole 265 to a north pole 267 of permanent ring magnet 264a.

Similarly, returning to FIG. 11, second angle measurement system 230b includes a speed sensor 232b and a continuous angular position sensor 234b. Speed sensor 232b includes a toothwheel 238b and a magnetic field sensor 240b providing an incremental angular position signal 233b. According to one embodiment, continuous angular position sensor 234b includes a GMR angle sensor chip 262b positioned within a magnetic field of a permanent ring magnet 264b mounted circumferentially about second shaft 254 and providing a continuous angular position signal 235b.

In one embodiment, as illustrated by FIG. 11, first and second angle measurement systems 230a and 230b share a controller 236. Controller 236 receives incremental angular position signal 233a from wheelspeed sensor 232a and continuous angular position signal 235a from GMR angle sensor 262a of angle measurement system 230a, and receives incremental angular position signal 233b from wheelspeed sensor 232b and continuous angular position signal 235b from GMR angle sensor 262b of angle measurement system 230b. According to one embodiment, in a fashion similar to that described above, controller 236 calibrates continuous angular position signal 235a based on incremental position signal 233a to determine a calibrated continuous angular position signal for GMR angle sensor 262a. Additionally, controller 236 calibrates continuous angular position signal 235b based on incremental position signal 233b to determine a calibrated continuous angular position signal for GMR angle sensor 262b.

According to one embodiment, controller 236 provides the calibrated angular position signal of GMR angle sensor 262a (or of GMR angle sensor 262a) as continuous angular position signal 237 which is indicative of the angular position of first shaft 252 (or of second shaft 254). In one embodiment, controller 236 determines an angular difference between the calibrated continuous angular position signal of GMR angle sensor 262a and the calibrated continuous angular position signal for GMR angle sensor 262b, wherein the angular difference is proportional to an amount and a direction of torque being applied to first shaft 252 (or to second shaft 254). In one embodiment, controller 236 simply provides the angular difference, which is also indicative of a direction of twist of torsion shaft 256, as a torque signal 270. In one embodiment, controller 236 determines and provides the torque as torque signal 270 based on the angular difference and on known physical parameters of torsion shaft 256 (e.g. diameter, material properties) stored in a memory 239.

Figure 13:
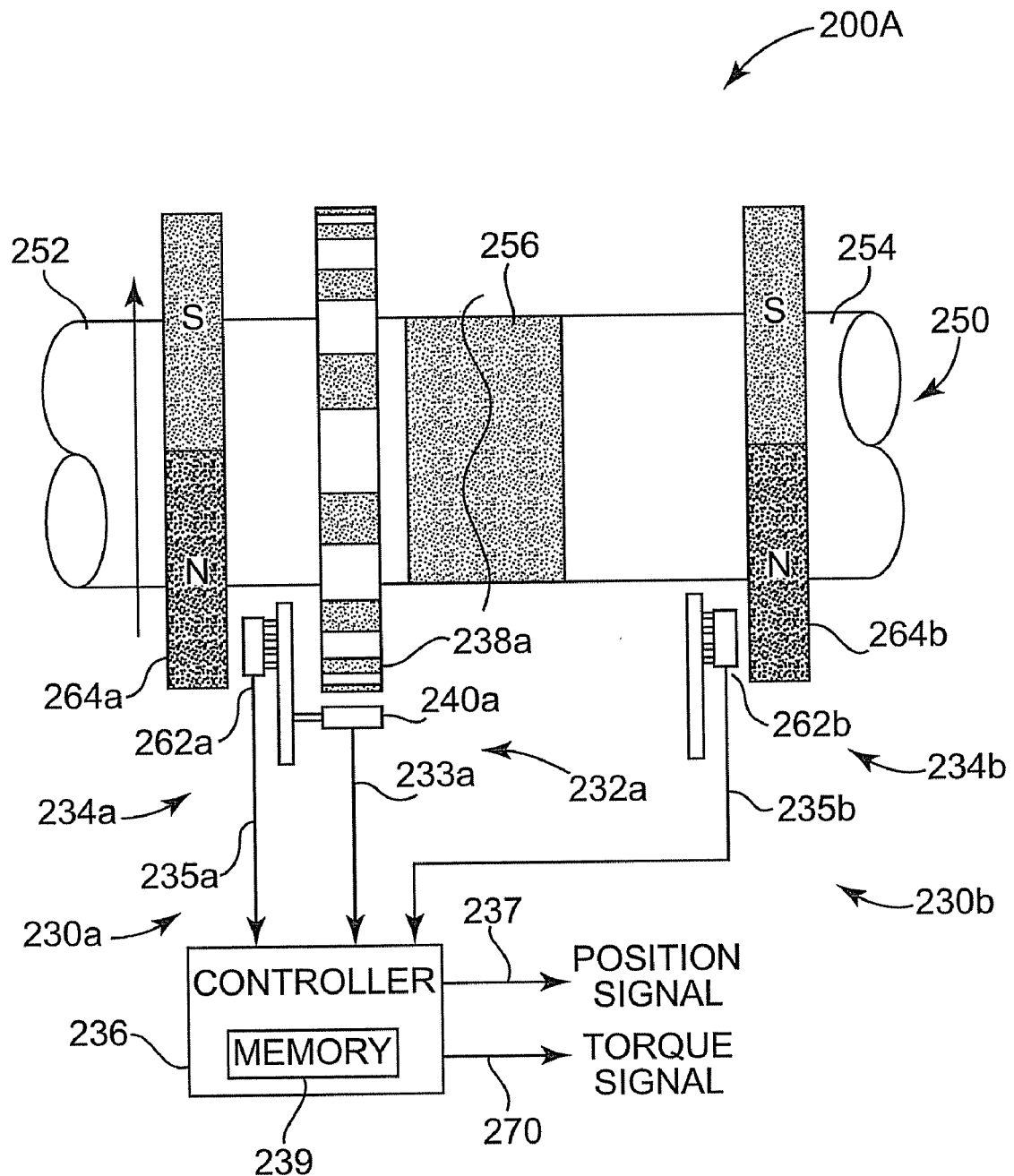
FIG. 13 is a block and schematic diagram illustrating a torque sensor according to one embodiment.

FIG. 13 illustrates an alternate embodiment 200A of sensor system 200 of FIG. 11. As illustrates, angle measurement system 230b of sensor system 200A includes only continuous angular position sensor 234b and does not include speed or incremental position sensor 232b. According to the embodiment of FIG. 13, controller 236 calibrates both the continuous angular position signal 235a of GMR angle sensor 262a and continuous angular position signal 235b of GMR angle sensor 262b based on incremental angular position signal 233a of speed or incremental position sensor 232a. It is noted that controller 236 is able to perform a calibration of continuous angular position sensor 234b, including GMR angle sensor 262b, only when there is no angular offset between first and second shafts 252 and 254 (i.e. no torque being applied). Position signal 237 and torque signal 270 are determined similar to that described above sensor system 200 of FIG. 11.

Figure 14:
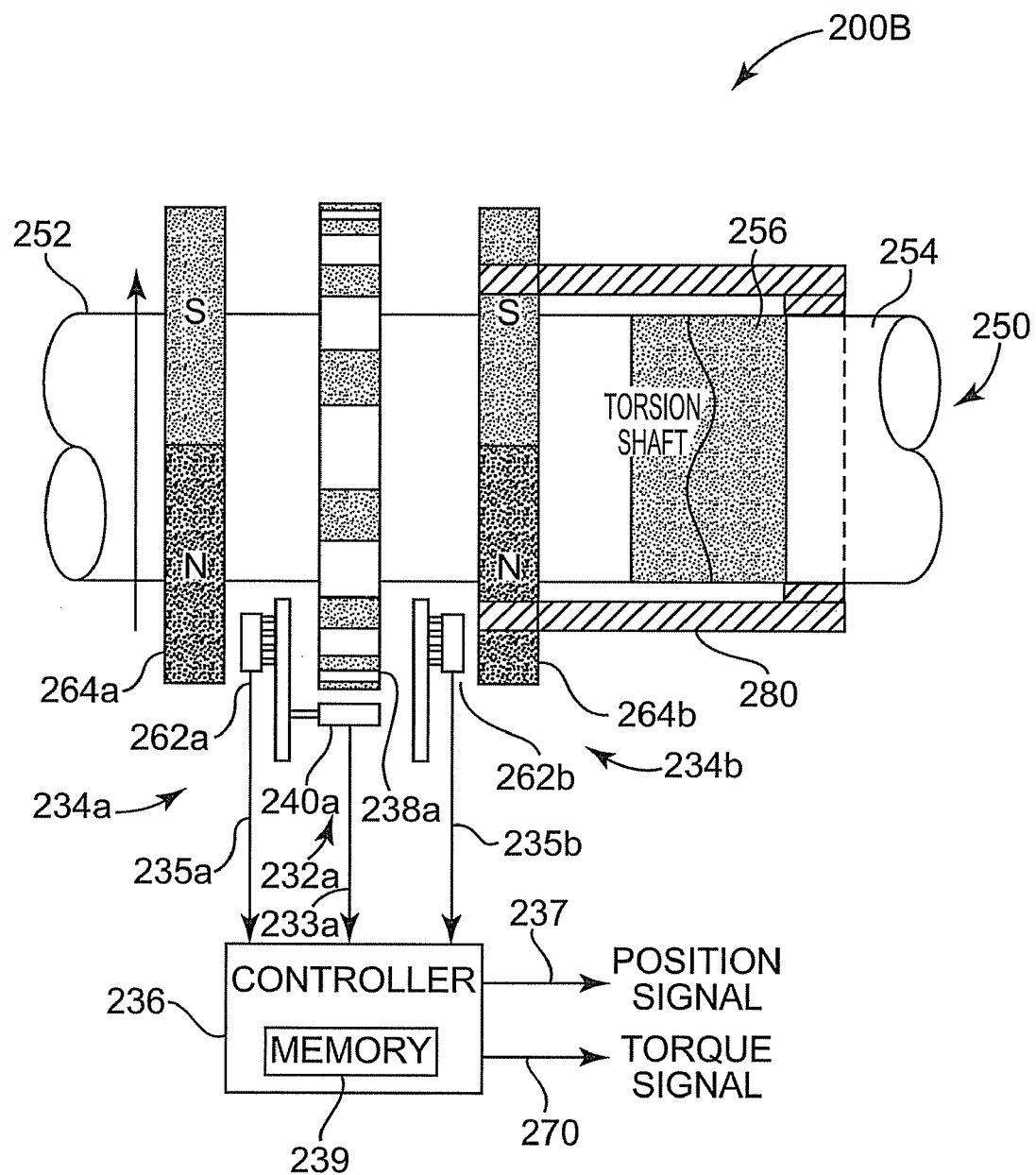
FIG. 14 is a block and schematic diagram illustrating a torque sensor according to one embodiment.

FIG. 14 illustrates an alternate embodiment 200B of sensor system 200 of FIG. 11. Sensor system 200B is identical to sensor system 200B of FIG. 13, except that permanent ring magnet 264b of angle measurement system 230b is mounted on a hollow shaft 280 that is coupled to and rotates with second shaft 254. Hollow shaft 280 extends about and over a torsion shaft 256 and over a portion of first shaft 252 so that permanent ring magnet 264b and GMR angle sensor 262b of continuous angular position sensor 234b are positioned proximate to angle measurement system 230a. In this fashion, sensor system 200B has a more compact footprint or module footprint relative to sensor systems 200 and 200A of FIGS. 11 and 13.

Figure 15:
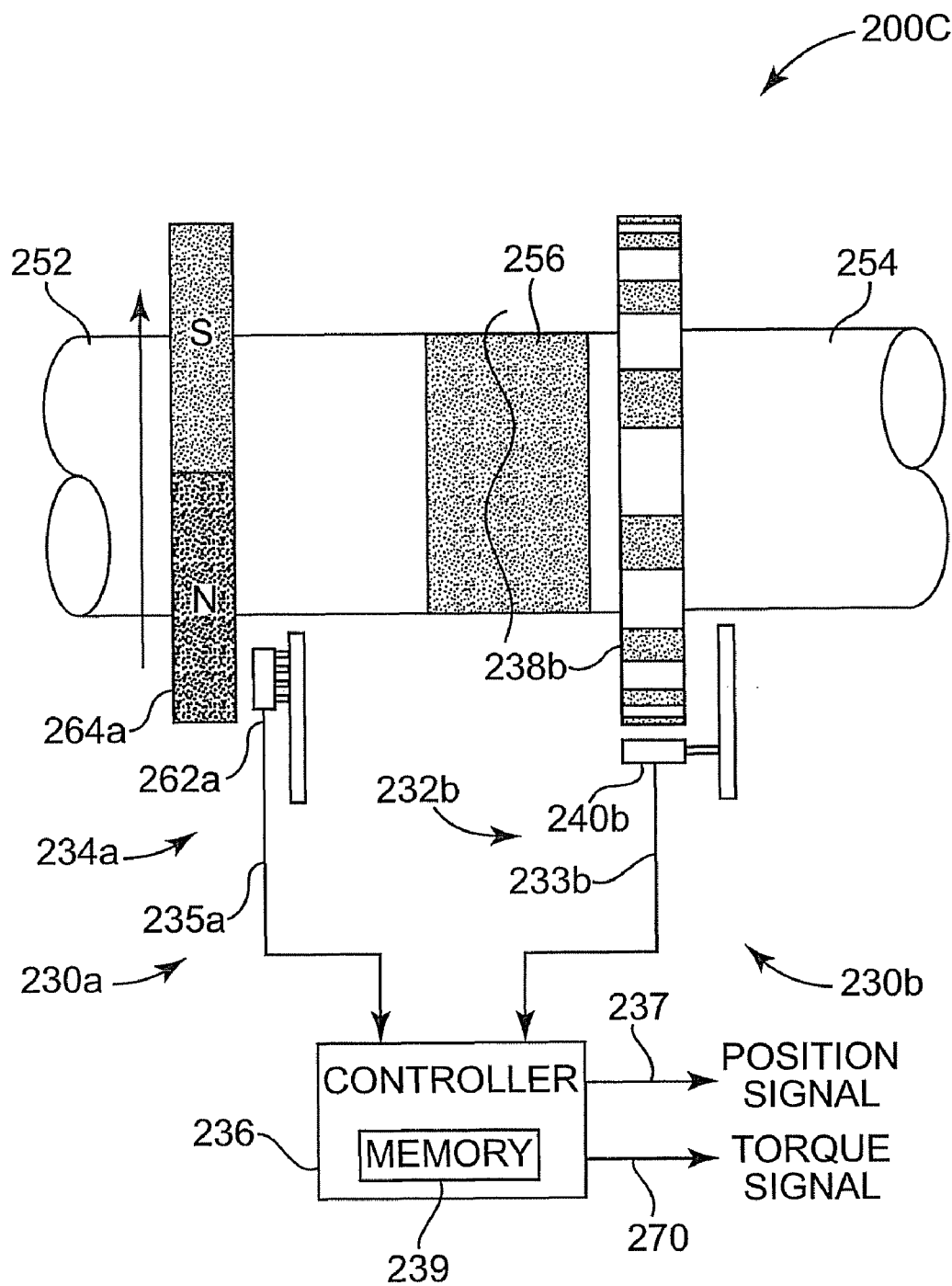
FIG. 15 is a block and schematic diagram illustrating a torque sensor according to one embodiment.

FIG. 15 illustrates an alternate embodiment 200C of sensor system 200 of FIG. 11, wherein first angle measurement system 230a includes only continuous angle position sensor 234a and second angle measurement system 230b includes only wheelspeed or incremental position sensor 232b. According to the embodiment of FIG. 15, controller 236 calibrates continuous angular position signal 235a based on incremental position signal 233b to provide calibrated continuous angular position signal 237 representative of the angular position of first shaft 252. Additionally, controller 236 determines an angular offset between first shaft 252 and second shaft 254 based on position signal 237 (i.e., the calibrated continuous angular position signal 235a) and incremental position signal 233b. Again, it is noted that controller 236 is able to perform a calibration of continuous angular position sensor 234b, including GMR angle sensor 262b, only when there is no angular offset between first and second shafts 252 and 254 (i.e. no torque being applied).

As with angle measurement system 30, it is noted that incremental angular position sensors 232a and 232b of the torque and angle sensors illustrated by FIGS. 11-15 may comprise any suitable type of incremental angular position sensor. For example, in some embodiments, angular position sensors 232a and 232b may utilize a polewheel type speed sensor, wherein a series of alternating magnetic poles (e.g. north-south-north-south) are employed and detected in lieu of teeth 46.

Figure 16:
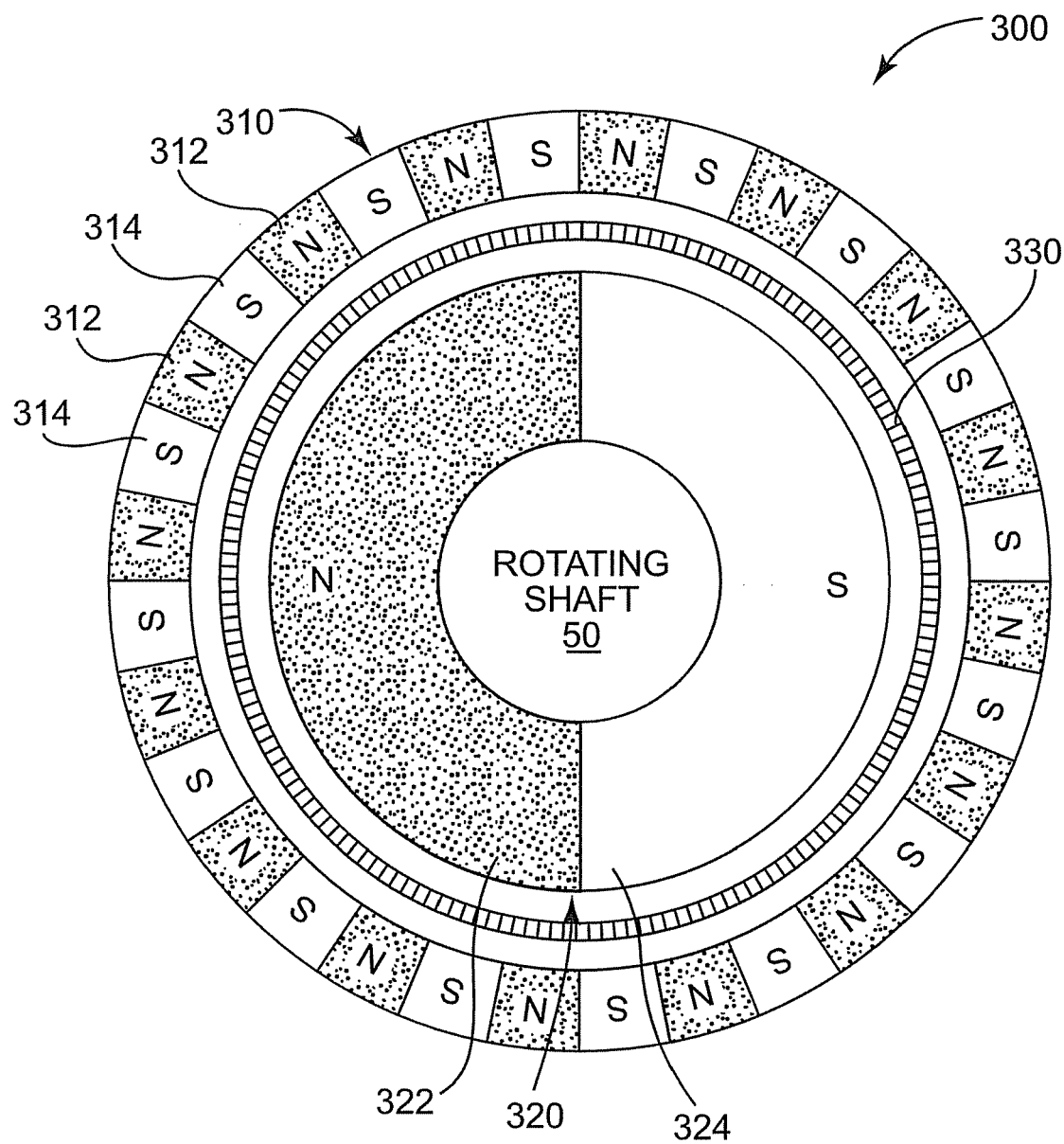
FIG. 16 is a schematic diagram illustrating one embodiment of a magnetic pole wheel according to one embodiment.

As illustrated by FIG. 16, according to one embodiment, wheelspeed sensor 32 and continuous angular position sensor 34 employ a common magnetic polewheel 300 mounted to rotating shaft 50 in lieu of separately using toothwheel (or polewheel) 38 and magnet 64 (see FIG. 1). According to one embodiment, polewheel 300 includes an outer magnetic ring 310 having alternating north and south poles 312 and 314 positioned along the circumference of polewheel 300, and an inner magnetic ring 320 comprising a north and a south pole 322 and 324. Outer magnetic ring 310 is employed by wheelspeed sensor 32 to determine incremental positions of shaft 50, with the boundaries between north and south poles 312 and 314 being similar to tooth flanks 49 of toothwheel 38 (see FIG. 2), and continuous angular position sensor 34 employing inner magnetic ring 320 in a fashion similar to permanent magnet 264a illustrated by FIG. 12. In one embodiment, a ferromagnetic ring 330 is positioned between outer and inner magnetic rings 310 and 320 to shield outer and inner magnetic rings 310 and 320 from another and enable them to be positioned more closely to one another.

Sharing polewheel 300 in this fashion enables angle measurement 30 (see FIG. 1) to be more compact in size. It is noted that common polewheel 300 may also be employed with the torque and angle sensor embodiments illustrated above by FIGS. 11-15.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An angular position measurement system comprising:
    a continuous angular position sensor configured to provide a first signal representative of a continuous angular position of a rotating shaft;
    an incremental angular position sensor configured to provide a second signal representative of incremental angular positions of the rotating shaft; and
    a controller configured to calibrate the first signal based on the second signal to provide a third signal representative of a calibrated continuous angular position of the rotating shaft.

2. The system of claim 1, wherein the continuous angular position sensor comprises a magnetoresistive angular position sensor.

3. The system of claim 2, wherein the continuous angular position sensor comprises a giant magnetoresistive sensor.

4. The system of claim 1, wherein the incremental angular position sensor comprises a wheelspeed sensor.

5. The system of claim 4, wherein the wheelspeed sensor comprises a toothwheel type wheelspeed sensor.

6. The system of claim 4, wherein the wheelspeed sensor comprises a polewheel type wheelspeed sensor.

7. The system of claim 6, wherein the wheelspeed sensor and the continuous angular position sensor each include a multi-pole magnetic ring, wherein the multi-pole magnetic rings are disposed on a single polewheel mounted to the rotating shaft.

8. The system of claim 1, wherein the controller is configured to dynamically calibrate the first signal during operation of the angle position measurement system.

9. The system of claim 1, wherein to calibrate the first signal the controller is configured to determine an angle difference between each incremental angular position of the second signal and a corresponding continuous angular position of the first signal over a full rotation of the rotating shaft, to determine an error curve based on the angle differences, and to subtract the error curve from the first signal to provide the third signal.

10. The system of claim 1, wherein the controller is configured to determine the error curve from the angle differences using interpolation techniques.

11. The system of claim 1, wherein the continuous angular position sensor comprises a magnetoresistive angle sensor having a set of adjustment parameters for adjusting the first signal, and wherein the controller is configured to calibrate the first signal by determining a set of adjustment parameter values for each signal segment of the first signal occurring between a pair of corresponding consecutive incremental positions of the second signal that when applied to the signal segment substantially minimizes an error between signal segment and a reference angle segment based on the corresponding consecutive incremental positions of the second signal, and to apply each set of adjustment parameter values to the corresponding signal segment of the first signal to provide the third signal.

12. The system of claim 1, wherein the controller is configured to calibrate the first signal by determining a gain factor for each signal segment of the first signal occurring between a pair of corresponding consecutive incremental positions of the second signal, wherein each gain factor is based on a difference in angular position from a beginning to an end of the corresponding signal segment relative to a difference in angular position between the corresponding pair of consecutive incremental positions, and wherein the controller is configured to apply each gain factor to the corresponding signal segment of the first signal to provide the third signal.

13. A method of measuring an angular position of a rotating shaft, comprising:
    determining a continuous angular position of the rotating shaft as a first signal;
    determining an incremental angular position of the rotating shaft as a second signal; and
    calibrating the first signal using the second signal to provide a third signal representative of a calibrated continuous angular position of the rotating shaft.

14. The method of claim 13, wherein determining the continuous angular position includes using a magnetoresistive angle sensor to measure the angular position of the rotating shaft.

15. The method of claim 13, wherein determining the incremental angular position includes using a wheelspeed sensor to measure incremental angular positions of the rotating shaft.

16. The method of claim 13, wherein calibrating the first signal includes:
    determining an angle difference between each incremental angular position of the second signal and a corresponding continuous angular position of the first signal over a full rotation of the rotating shaft;
    determining an error curve based on the position differences; and
    subtracting the error curve from the first signal to provide the third signal.

17. The method of claim 13, wherein the continuous angular position sensor comprises a magnetoresistive angle sensor having a set of adjustment parameters for adjusting the first signal, and wherein calibrating the first signal includes:
    determining a set of adjustment parameter values for each signal segment of the first signal occurring between a pair of corresponding consecutive incremental positions of the second signal that when applied to the signal segment substantially minimizes an error between signal segment and a reference angle segment based on the corresponding consecutive incremental positions of the second signal; and
    applying each set of adjustment parameter values to the corresponding signal segment of the first signal to provide the third signal.

18. The method of claim 13, wherein calibrating the first signal includes:
    determining a gain factor for each signal segment of the first signal occurring between a pair of corresponding consecutive incremental positions of the second signal, wherein each gain factor is based on a difference in angular position from a beginning to an end of the corresponding signal segment relative to a difference in angular position between the corresponding pair of consecutive incremental positions; and
    applying each gain factor to the corresponding signal segment of the first signal to provide the third signal.

19. A torque sensor comprising:
    a first magnetoresistive angle sensor adapted to provide a first continuous position signal representative of a continuous angular position of a first end of a rotating shaft;
    a second magnetoresistive angle sensor adapted to provide a second continuous position signal representative of a continuous angular position of a second end of the rotating shaft, the first and second ends of the rotating shaft coupled to one another by a torsion shaft;

at least one wheelspeed sensor adapted to provide at least one incremental position signal representative of incremental angular positions of the rotating shaft; and a controller configured to calibrate the first and second continuous position signals based on the at least one incremental position signal so as to form calibrated first and second continuous position signals, to determine an angular difference between the first and second continuous position signals, and to provide a torque signal representative of a torque on the shaft based on the angular difference.

20. The torque sensor of claim 19, wherein the first and second magnetoresistive angle sensors comprise giant magnetoresistive sensors.

21. The torque sensor of claim 19, wherein the at least one wheelspeed sensor comprises:

a first wheelspeed sensor adapted to provide a first incremental position signal representative of incremental angular positions of the first end of the shaft; and a second wheelspeed sensor adapted to provide a second incremental position signal representative of incremental angular positions of the second end of the shaft, wherein the controller is configured to calibrate the first continuous position signal based on the first incremental position signal to form the calibrated first continuous position signal, and to calibrate the second continuous position signal based on the second incremental position signal to form the calibrated second continuous position signal.

22. The torque sensor of claim 19, wherein to calibrate the first and second continuous position signals, the controller is configured to determine an angle difference between each incremental angular position of the at least one incremental position signal and a corresponding continuous angular position of each of the first and second continuous position signals over a full rotation of the rotating shaft, to determine a first error curve based on the angle differences associated with the first continuous position signal and a second error curve based on the angle differences associated with the second continuous position signal, and to subtract the first error curve from the first continuous position signal to form the calibrated first continuous position signal and to subtract the second error curve from the second continuous position signal to form the calibrated first and second continuous position signals.

23. The torque sensor of claim 19, wherein the first and second continuous angular position sensors comprise magnetoresistive angle sensors each having a set of adjustment parameters for respectively adjusting the first and second continuous position signals, and wherein to calibrate the first and second continuous position signals the controller is configured to:

determine a set of adjustment parameter values for each signal segment of the first and second continuous position signals occurring between corresponding pairs of consecutive incremental positions of the at least one incremental position signal that when applied to the signal segment substantially minimizes an error between the signal segment and a reference angle segment based on the corresponding pair of consecutive incremental positions; and to apply each set of adjustment parameter values to the corresponding signal segment to form the calibrated first and second continuous position signals.

24. The torque sensor of claim 19, wherein the controller is configured to calibrate the first and second continuous position signals by determining a gain factor for each signal segment of the first and second continuous position signals occurring between corresponding pairs of consecutive incremental positions of the at least one incremental position signal, wherein each gain factor is based on a difference in angular position from a beginning to an end of the corresponding signal segment relative to a difference in angular position between the corresponding pair of consecutive incremental positions, and wherein the controller is configured to apply each gain factor to the corresponding signal segment of the first and second continuous position signals to form the calibrated first and second continuous position signals.

25. A torque sensor for measuring torque on a rotating shaft having a first end and a second end joined by a torsion shaft, the torque sensor comprising:

a magnetoresistive angle sensor adapted to provide a continuous position signal representative of a continuous angular position of a first end of a rotating shaft;

a wheelspeed sensor adapted to provide an incremental position signal representative of incremental angular positions of the second end of the shaft; and a controller configured to calibrate the continuous position signal based on the incremental position signal, to determine an angular offset between the first and second ends based on the continuous position signal and the incremental position signal, and to provide a torque signal representative of a torque on the shaft based on the angular offset.

* * * * *